Figure 1:
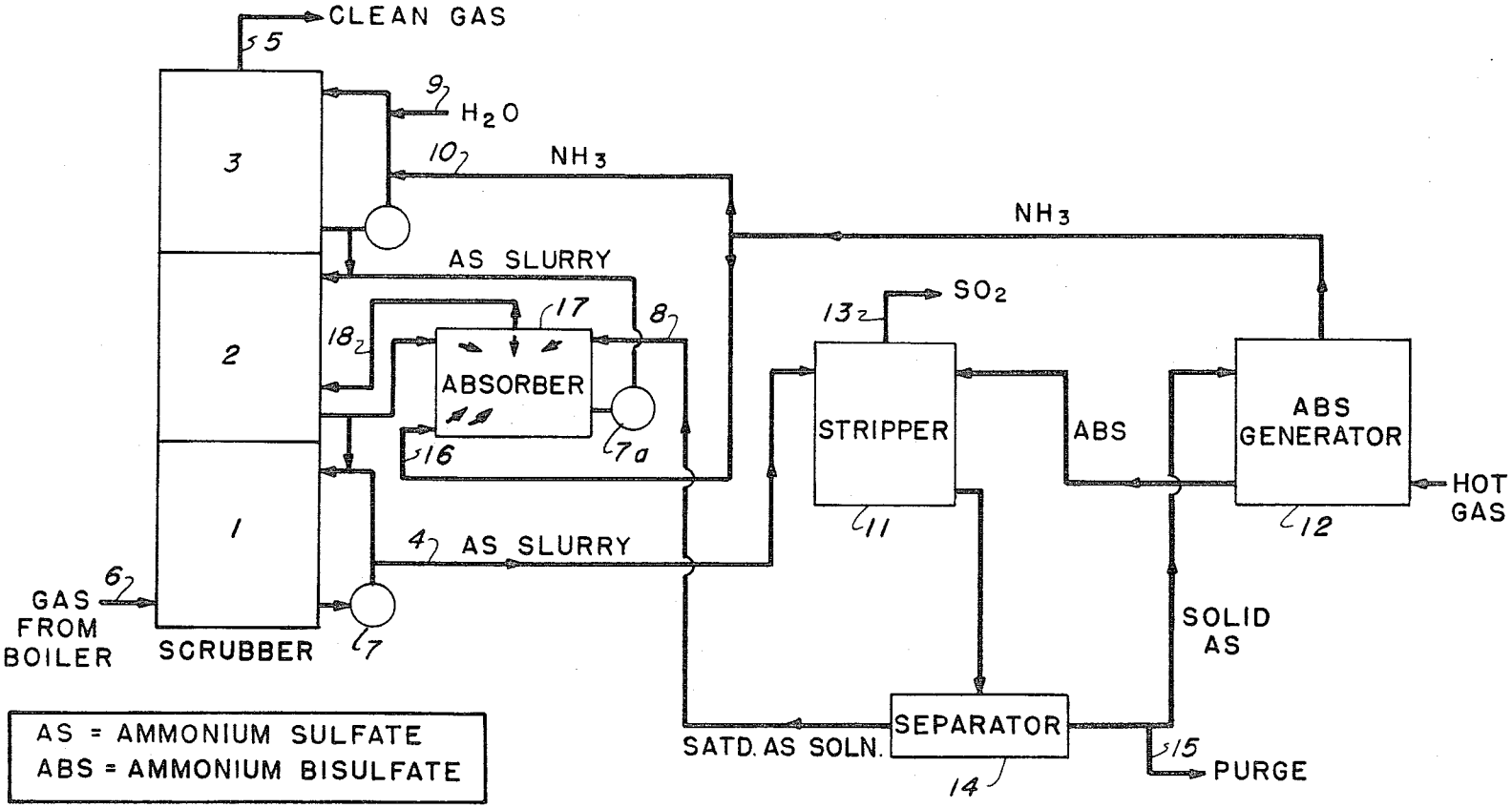
Figure 2:
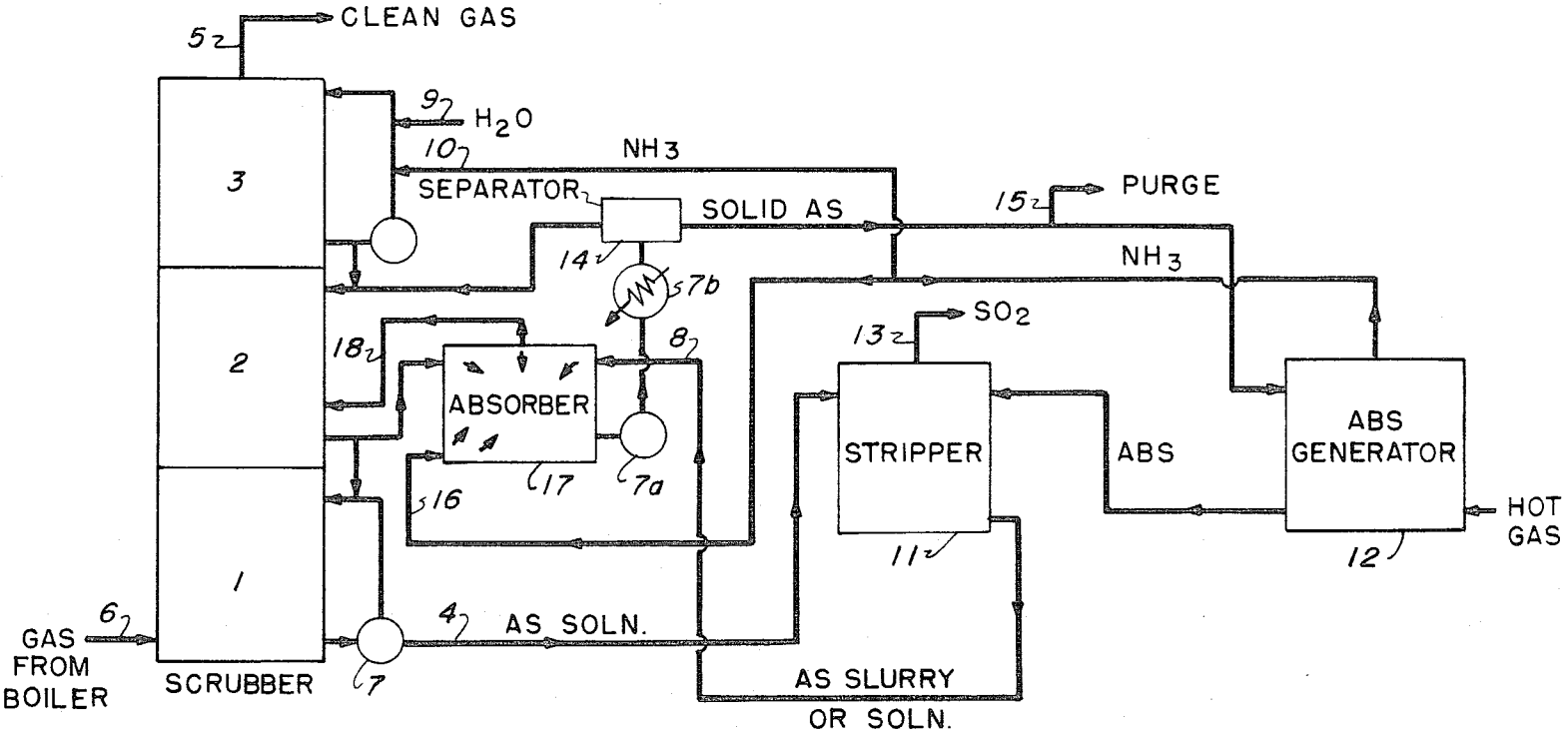
Figure 3:
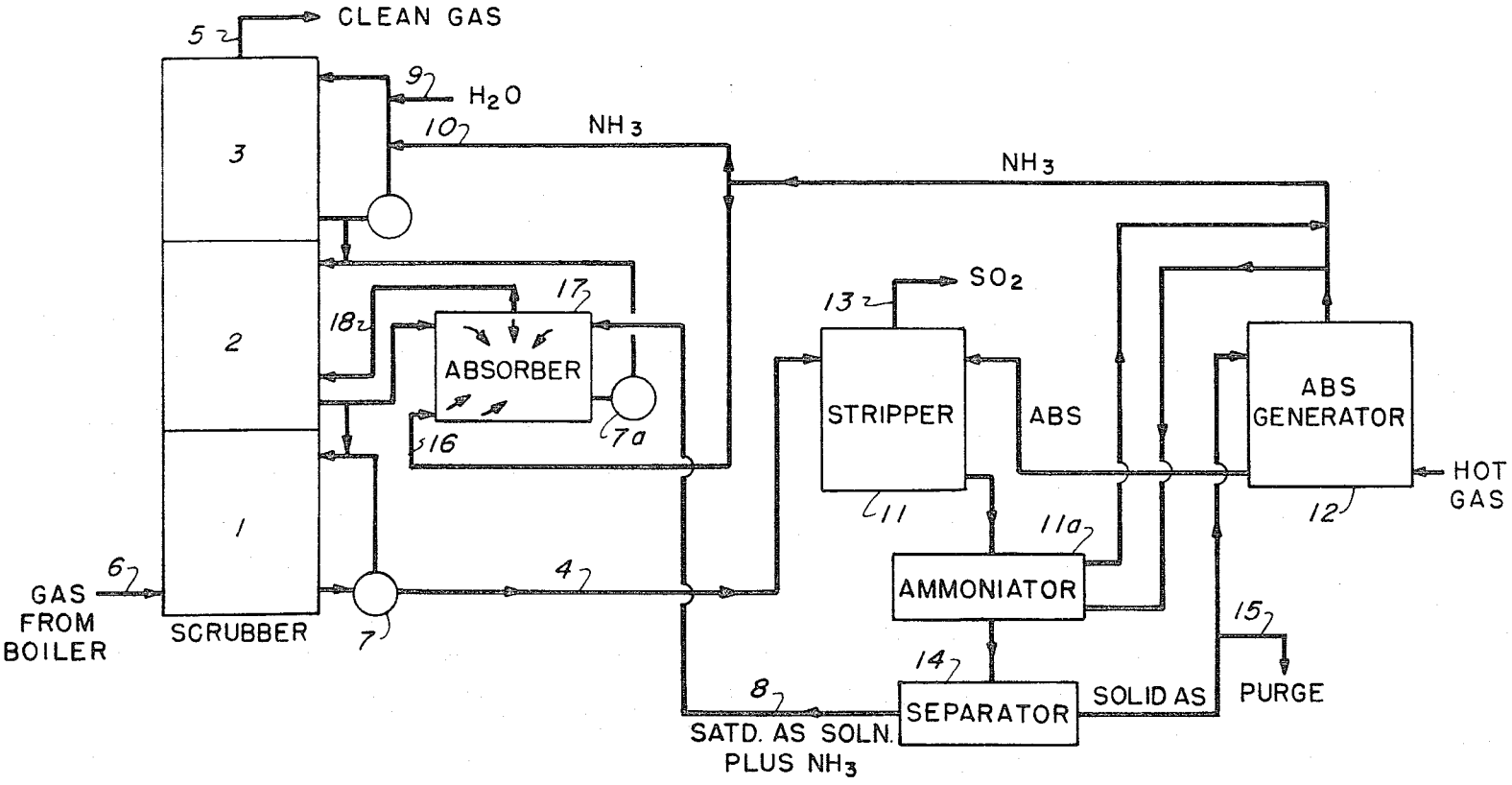

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 17, 1973

909 O.G. 795

T909,017

SULFUR DIOXIDE REMOVAL FROM STACK GASES

John E. Jordan, 1306 30th St., Sheffield, Ala. 35660, and George M. Newcombe, 200 Seven Oaks Road, Apt. 8–G, Durham, N.C. 27704

Filed Apr. 13, 1972, Ser. No. 243,636

Int. Cl. C01b *17/00*

U.S. Cl. 423—242

3 Sheets Drawing. 18 Pages Specification

Sulfur oxides can be removed from waste gases by absorption in ammoniacal solution forming ammonium bisulfite, ammonium sulfite, and, unavoidably, ammonium sulfate. The absorber effluent solution may be treated with ammonium bisulfate to form ammonium sulfate and to release a concentrated stream of $SO_2$ suitable for conversion to $H_2SO_4$ or elemental sulfur. Ammonium sulfate may be crystallized from the solution and thermally decomposed to ammonia for recycle to the absorber and ammonium bisulfate for recycle to the $SO_2$ release step. The economics of the process are improved by operating the absorber with an ammoniacal solution having a high content of ammonium sulfate; subsequent treatment of the scrubber effluent with ammonium bisulfate and, after $SO_2$ release, with ammonia causes precipitation of ammonium sulfate without evaporation of the large amounts of water required in earlier concepts of this process.

SULFUR DIOXIDE REMOVAL FROM STACK GASES

Filed April 13, 1972 3 Sheets-Sheet 1

ARRANGEMENT A

SULFUR DIOXIDE REMOVAL FROM STACK GASES

Filed April 13, 1972 3 Sheets-Sheet 1

ARRANGEMENT B

SULFUR DIOXIDE REMOVAL FROM STACK GASES

Filed April 13, 1972 3 Sheets-Sheet 3

ARRANGEMENT C